US006766310B1

(12) United States Patent
Occhipinti et al.

(10) Patent No.: US 6,766,310 B1
(45) Date of Patent: Jul. 20, 2004

(54) NEURO-FUZZY NETWORK ARCHITECTURE WITH ON-LINE LEARNING CAPABILITIES AND CORRESPONDING CONTROL METHOD

(75) Inventors: Luigi Occhipinti, Ragusa (IT); Eusebio Di Cola, Messina (IT); Mario Lavorgna, Bacoli (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 422 days.

(21) Appl. No.: 09/718,068

(22) Filed: Nov. 21, 2000

(30) Foreign Application Priority Data

Nov. 22, 1999 (EP) ............................................ 99830719

(51) Int. Cl.[7] .............................................. G06F 15/18
(52) U.S. Cl. ........................................ 706/16; 711/149
(58) Field of Search ...................... 706/15–44; 711/149

(56) References Cited

U.S. PATENT DOCUMENTS

| 5,245,695 A | * | 9/1993 | Basehore ........................ 706/4 |
| 5,425,131 A | * | 6/1995 | Basehore ........................ 706/8 |
| 5,459,816 A | * | 10/1995 | Basehore et al. ............. 700/50 |

FOREIGN PATENT DOCUMENTS

| DE | 4225758 | 2/1994 | ........... G06F/15/20 |
| EP | 0742516 | 11/1996 | ........... G06F/9/445 |

OTHER PUBLICATIONS

DANIELA: (Digital Analog Neuro–fuzzy Implementation of Enhanced Learning Algorithms) AT '96—1st International Symposium Workshop on Neuro–Fuzzy Systems, Aug. 1996, Marcello Chiaberge.*

Software–Hardware System for the Design of Adaptive Fuzzy Digital Signal Processing Applications, Labib Sultan, IEEE Member; (1998) IEEE, pps. 461–464.*

Processor Core for Adaptive Fuzzy and DSP Applications; Labib Sultan, IEEE Member (1998) IEEE, pps. 1072–1075.*

(List continued on next page.)

*Primary Examiner*—Leo Picard
*Assistant Examiner*—Michael B. Holmes
(74) *Attorney, Agent, or Firm*—Lisa K. Jorgenson; Allen, Dyer, Doppelt, Milbrath & Gilchrist, P.A.

(57) ABSTRACT

A neuro-fuzzy integrated architecture which permits on-line self-training includes at least one microcontroller of the fuzzy type dedicated to fuzzy rules computing and integrated monolithically on a semiconductor together with a non-volatile memory. Also included within the same integrated circuit are a microprocessor, a volatile memory unit, and an arbiter block linked to a bus interconnecting the fuzzy microcontroller, the microprocessor, and the volatile memory unit. The arbiter block controls access to the memory unit by the microprocessor or the fuzzy microcontroller. An additional fuzzy co-processor may be connected between the fuzzy microcontroller and the microprocessor for performing the fuzzy logic operations.

26 Claims, 8 Drawing Sheets

OTHER PUBLICATIONS

A High Performance Fuzzy Inference Processor and Its Evaluation System, Yasuhiko Nitta, Ken–ichi Shimomura, Narumi Sakashita, Shinji Komori, and Kazuo Kyuma; (1995) IEEE, pps. 1613–1620.*

Colodro et al., A circuit for learning in fuzzy logic–based controllers, 1995 IEEE Symposium on circuits and systems (Cat. No. 95CH35771), Proceedings on ISCAS' 95–International Symposium on Circuits and Systems, Seattle, WA USA, Apr. 28–May 3, 1995, pp. 279–282, vol. 1, XP0021555745, 1995, New York, NY, USA, IEEE, USA ISBN: 0–7803–2570–2.

Sultan, *Processor core for adaptive fuzzy and DSP applications*, 1998 IEEE International Conference on Fuzzy Systems Proceedings. IEEE World Congress on Computational Intelligence, (Cat. No. 98CH36228), Anchorage, AK, USA, May 4–9, 1998, pp. 1072–1075, vol. 2, XP002155743, 1998, New York, NY, USA, IEEE, USA, ISBN: 0–7803–4863–X.

Biz et al., *Furnace temperature control with fuzzy microcontroller*, SMCIA/99 Proceedings of the 1999 IEEE Midnight–Sun Workshop on Soft Computing Methods in Industrial Applications, Kuusamo, Finland, Jun. 16–18, 1999, pp. 75–79, XP002155744, 1999, Piscataway, NJ, USA, IEEE, USA, ISBN 0–7803–5280–7.

* cited by examiner

| | $W_1$ | | | | | | | | $W_0$ | | | | | | | |
|---|---|---|---|---|---|---|---|---|---|---|---|---|---|---|---|---|
| 15 | | | | | | | | 7 | | | | | | | | 0 |
| $W_{17}$ | $W_{16}$ | $W_{15}$ | $W_{14}$ | $W_{13}$ | $W_{12}$ | $W_{11}$ | $W_{10}$ | $W_{07}$ | $W_{06}$ | $W_{05}$ | $W_{04}$ | $W_{03}$ | $W_{02}$ | $W_{01}$ | $W_{00}$ |
| $W_{37}$ | $W_{36}$ | $W_{35}$ | $W_{34}$ | $W_{33}$ | $W_{32}$ | $W_{31}$ | $W_{30}$ | $W_{27}$ | $W_{26}$ | $W_{25}$ | $W_{24}$ | $W_{23}$ | $W_{22}$ | $W_{21}$ | $W_{20}$ |
| | $W_3$ | | | | | | | | $W_2$ | | | | | | | |

| V | O | S | Z |

NEURO-FUZZY NETWORK ARCHITECTURE WITH ON-LINE LEARNING CAPABILITIES AND CORRESPONDING CONTROL METHOD

FIELD OF THE INVENTION

This invention relates to electronic circuits, and, more particularly, to a neuro-fuzzy network architecture having self-training or on-line learning capabilities.

BACKGROUND OF THE INVENTION

The invention particularly relates to a self-training neuro-fuzzy network architecture including at least one fuzzy microcontroller (fuzzyfier/defuzzyfier) dedicated for calculating fuzzy rules. The fuzzy microcontroller may be integrated monolithically in a semiconductor along with a non-volatile memory, for example. The invention also relates to a method of electronically controlling semiconductor-integrated electronic devices using self-training.

Of the currently available electronic devices integrated monolithically in a semiconductor, the fuzzy logic products typically fall in the category of processors, microcontrollers, or general purpose fuzzy co-processors. However, these products are unsuitable for operation in an on-line learning and self-training mode. For example, there exist no commercially available devices which include circuit portions adapted to process dedicated self-training instructions.

The unavailability of integrated devices with self-training processing features makes prior art approaches ill-suited to address problems requiring a capability to accommodate process variations and changing environmental conditions. Such is the case, for example, with the control of fuel injection systems in internal combustion engines and in other automotive applications.

The present invention is directed to a semiconductor integrated electronic device for enabling processing of predetermined instructions or data processing procedures by self-training. The technical problem addressed by the present invention is to provide a programmable device as described above which is of the neuro-fuzzy type.

SUMMARY OF THE INVENTION

It is an object of the present invention to provide a programmable integrated device of the neuro-fuzzy type with dedicated hardware appropriate for on-line learning capabilities. In essence, the invention provides a fuzzy neural system (hereinafter Fuzzy Neural Network or FNN) which uses the properties of neural networks to automatically learn the variations of a process to be controlled, as well as to adjust its behavior accordingly by adaptation of the fuzzy rule system parameters for increased efficiency throughout.

Based on this concept, the objects are achieved by a self-training neuro-fuzzy network including at least one fuzzy microcontroller dedicated to fuzzy rules computing, a non-volatile memory integrated monolithically with the at least one fuzzy microcontroller on a semiconductor and connected thereto, a microprocessor, a volatile memory, and a bus interconnecting the fuzzy microcontroller. The microprocessor, the volatile memory, and an arbiter circuit are connected to the bus. The arbiter circuit controls access to the volatile memory by the microprocessor and the fuzzy microcontroller.

More specifically, the self-training neuro-fuzzy network may also include a fuzzy co-processor connected between the fuzzy microcontroller and the microprocessor for performing fuzzy logic operations. The fuzzy co-processor may be a slave to the microprocessor. Furthermore, an arithmetic logic unit may be connected to the microprocessor, and the arithmetic logic unit may include a sequential machine including a plurality of internal registers.

Additionally, the volatile memory may be a dual port random access memory. The self-training neuro-fuzzy network may further include an interface connected between the volatile memory and the non-volatile memory for exchanging data therebetween. Also, an input/output (I/O) module may be connected to the microprocessor for interfacing with external peripherals.

The invention also relates to a method of electronically controlling an electronic device by self-training where the electronic device is monolithically integrated on a semiconductor and includes at least one fuzzy microcontroller for fuzzy rule computing and a non-volatile memory connected thereto. The method includes writing data from the non-volatile memory to a volatile memory, reading data from the volatile memory and executing predetermined sequences of instructions on the data, connecting an arbiter circuit to a bus interconnecting the fuzzy microcontroller, the microprocessor, and the memory unit, and activating a fuzzy co-processor with the arbiter circuit. The fuzzy co-processor is activated upon receipt and recognition of a fuzzy logic instruction from the volatile memory. Additionally, the fuzzy co-processor may be operated as a slave to the microprocessor.

BRIEF DESCRIPTION OF THE DRAWINGS

The features and advantages of the architecture and method according to the invention will become apparent from the following description of embodiments thereof, given by way of illustration and non-limitative example, with reference to the accompanying drawings, in which.

DETAILED DESCRIPTION OF THE PREFERRED EMBODIMENTS

With reference to the drawing figures, a circuit architecture 1 according to the present invention for implementing an on-line self-training neuro-fuzzy network in a single integrated electronic device is generally shown in schematic form. The architecture 1 may be conceptualized as a complex integrated system including a number of functional blocks. The inner construction and interconnections of these blocks with one another will now be described.

Figure 1:
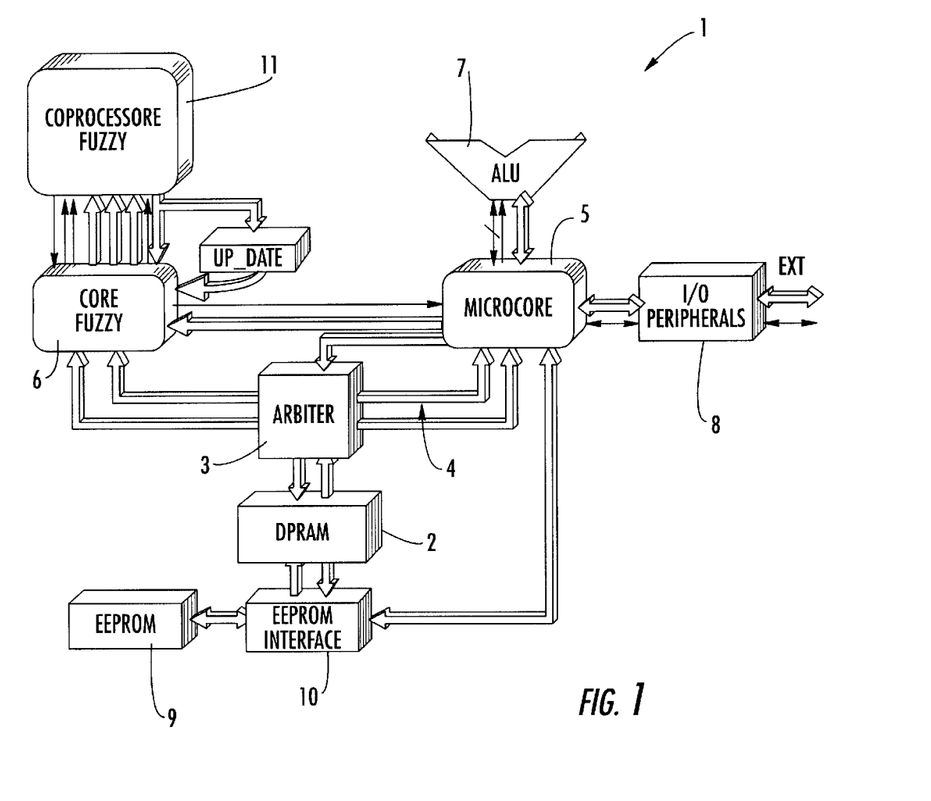
FIG. 1 is a schematic diagram of a neuro-fuzzy network architecture according to the present invention.

The inner construction of the system is shown schematically in FIG. 1 and includes a memory unit 2, preferably (but not exclusively) a dual port random access memory (DPRAM). An arbitration block or circuit ARBITER 3 is adapted to manage the arbitration of a bus 4 interlinking the components of the system 1. Further, a microprocessor 5 represents the decision or master portion of the system 1. A dedicated fuzzy co-processor or fuzzyfier/defuzzyfier 11 calculates the fuzzy rules. A core fuzzy 6 is also included, which is a dedicated co-processor adapted to manage the fuzzy operations.

Moreover, the system includes a dedicated arithmetic logic unit (ALU) 7 for carrying out algebraic operations between various internal registers of the microprocessor 5 and the ALU 7 itself. A peripheral unit handling input/output (I/O) module 8 interfaces with certain external peripheral units. A non-volatile memory 9, such as an EEPROM or other type of non-volatile memory unit, is also included. Additionally, an interface 10 is provided for exchanging data between the DPRAM unit 2 and the non-volatile EEPROM 9.

The method of electronic control by self-training implemented by the architecture 1 of the present invention will now be explained. To provide the neuro-fuzzy network with improved interpreting capabilities, sigmoid and triangular activation functions are used, as explained hereinafter. The operational code for the action to be taken, i.e., the code containing the fuzzy rules, learning rules, and other calculation instructions to be used, is stored in the EEPROM 9. The latter are loaded into the DPRAM 2 at power-on. It is from this memory that the microprocessor 5 receives the set of instructions to be interpreted and executed.

When the instruction is of the fuzzy type, the microprocessor 5 supplies the arbiter block 3 with a signal enabling the core fuzzy 6 to read from the DPRAM unit 2. The core fuzzy 6 will then control the fuzzy co-processor 11 to execute the various rules. When the instructions are not of a fuzzy type, the instructions are executed directly by the microprocessor 5 or by the ALU 7 where algebraic operations are involved.

The construction, interconnections and operation of the individual functional blocks of the architecture 1 will now be described.

Microprocessor Block 5

The microprocessor 5 is the "heart" of the system 1, and it decides on the action to be taken for each instruction read from the DPRAM unit 2. The microprocessor 5 is enabled by a signal START from outside the integrated architecture 1. For example, the signal START could be issued from a sensing device mounted on the same supporting board as the architecture 1. Upon receiving the signal START, the microprocessor 5 begins to read, from the memory 2, the number of fuzzy rules and the addresses where the parameters W, X, Y, MU are respectively stored or will be stored in the memory. In an initial state, the microprocessor 5 enables the arbiter block 3 by a signal SEL=0 enabling it to read from the DPRAM unit 2. At the same time, the core fuzzy 6 is temporarily disconnected.

Simultaneously, the address bus 4 allows the first location in the memory unit 2 (being 0000 in the hexadecimal code) to be addressed, thereby placing the unit 2 in a read condition by enabling the signals RNW and NOTCS.

Upon receiving the signal START, the microprocessor 5 moves to a next state. Otherwise, it is kept in the initial state. In the states that come immediately thereafter, the microprocessor 5 will be respectively input with the parameters WPOS, XPOS, YPOS, MUPOS and ADDRULES. These parameter represent the addresses of the locations in the memory unit 2 where the weightings of the connections, the fuzzy inputs, defuzzyfied outputs from the fuzzy co-processor, activating values of the fuzzy rules, and address of the fuzzy rule calculation subroutine are respectively stored or will be stored. For example, there may be 256 addresses for the fuzzy rule calculation subroutine, with 8 inputs and 4 outputs per rule.

Directly after loading the parameters, the commands (i.e., the instructions) are interpreted. In addition to being fuzzy types, these instruction may be arithmetic or interrupt management types, in both hardware and software, such as INT1 relating to the FNN network learning. The appearance of the hexadecimal code 0036 in the code stored in the DPRAM 2 results in the microprocessor 5 entering and being held in a wait state until it receives an interrupt signal (INT0, INT1, INT2, or NMI).

On the other hand, when a hexadecimal code FF80 is read, a learning step is to be carried out. The microprocessor 5 jumps to a relative state in which it acquires the sign of the weighting variations and the learning coefficient, as explained hereinafter. This information is always included in the DPRAM unit 2, and is set forth below to make the invention more clearly understood.

Figure 2:
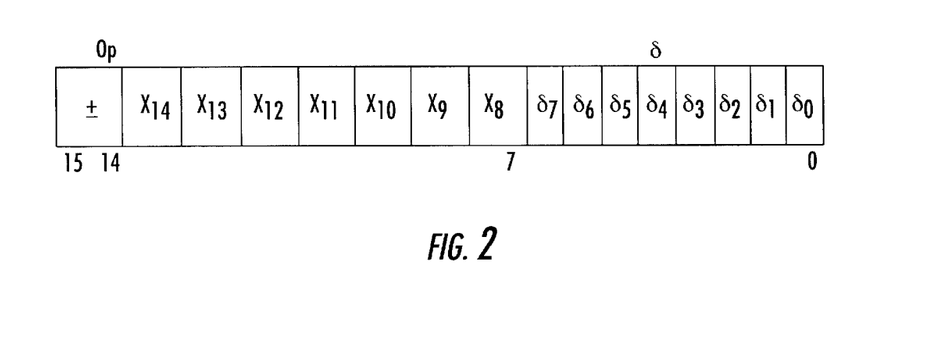
FIG. 2 is a schematic diagram of an exemplary memory word including learning instructions for the architecture of FIGS. 1.

The information relating to learning has the format shown in FIG. 2. Op may have a logic value of 0 or 1. When 0, it indicates a subtract operation, and when 1, it indicates an add operation. The bits from the seventh to the 14th (shown shaded) are not used. Therefore, the above memory word will include the numerical value expressed by the following number in binary form:

$$32768*Op+\delta$$

where the numerical value 32768 results from the bit Op being at the fifteenth location and having, accordingly, the weighting $2^{15}$.

The learning step is carried out while taking account of the error which exists between the actual output from the FNN network (designated $y_{FNN}$) and the target output for the type of input pattern designated $y_{target}$. That is:

$$w(t+1)=w(t)\pm(\delta^*\mu)^*(y_{FNN}-y_{target})$$

In actual practice, the following empirical relationship is more frequently used:

$$w(t+1)=w(t)\pm(\delta^*\mu)1/1024$$

To execute it, the microprocessor 5 must have received the values of the current weightings and the activation values, effect the division through 1024 (which is merely a ten-position rightward shift of the word $\delta^*\mu$), execute the operation contained in Op with the weightings loaded from the DPRAM unit 2, and store these values at the locations of the previously used weightings (i.e., overwriting them).

Figure 3:
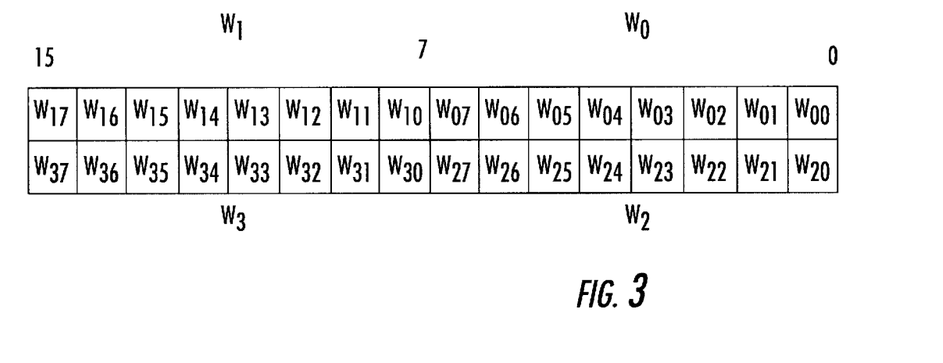
FIG. 3 is a schematic diagram of another exemplary memory word including fuzzy logic information for the architecture of FIG. 1.

The weightings are located in the memory and stored as bytes within a word including two bytes so that one word will include two weightings W. The format of these weightings is shown in FIG. 3. Thus, a word of weighting W1 will have the binary value of the following number stored in it:

$$w_1*256+w_0$$

The same applies to the weightings W2 and W3, and the operation is iterated for all the fuzzy rules. The iteration is performed by comparing the cumulative value in a counter CURRUL, which specifies the current rule, with the number of rules NRULES stored in the DPRAM unit 2. As long as CURRUL<NRULES, the microprocessor 5 will iterate the comparison. Otherwise, it goes into the next state.

Arbiter Block 3

Figure 4:
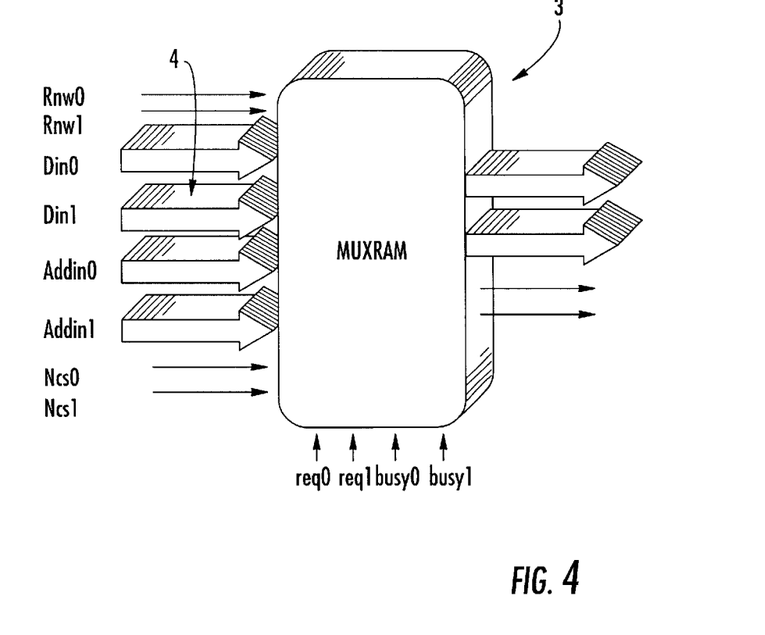
FIG. 4 is a schematic diagram illustrating an arbiter block incorporated into the architecture of FIG. 1.

The arbiter block 3 is a circuit block designed to prevent possible clashes from occurring between the core fuzzy 6 and the microprocessor 5 when both try to access the DPRAM unit 2. Initially, only the microprocessor 5 is enabled to read from the DPRAM unit 2, and it will interpret instructions found therein and decide on the operations to be effected. In fact, if the microprocessor 5 encounters a fuzzy rule code at a given address in the DPRAM unit 2, it then enables the core fuzzy 6 and simultaneously allows the arbiter block 3 to handle the access to the DPRAM unit 2 as appropriate. Conversely, if the microprocessor 5 reads non-fuzzy instructions, the arbiter block 3 will just enable the microprocessor 5. The arbiter block is shown diagramatically in FIG. 4.

ALU (Arithmetic Logic Unit) 7

The arithmetic logic unit 7 may be optionally included to allow the architecture 1 to perform computational operations not only of the fuzzy type but also of the mathematical type. This unit 7 will excute, as directed by the microprocessor 5, arithmetic operations (addition, subtraction, multiplication, division), logic operations (AND, OR, NOT, XOR, etc.), as well as other data manipulations. Such data manipulations may include exchanging the contents of internal registers with memory locations, right and leftward shifts, single-bit testing, etc.

Figure 5:
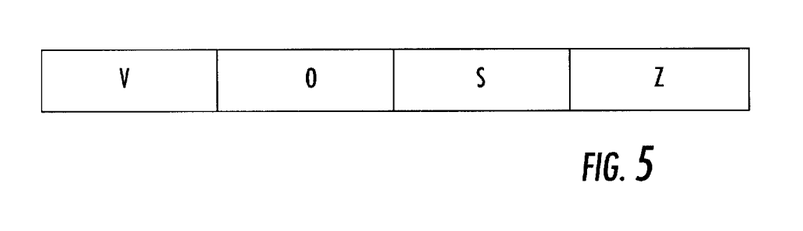
FIG. 5 is a schematic diagram of four-bit flag registers for use with the architecture of FIG. 1.

The ALU 7 includes internal circuitry arranged to perform the above-listed functions, and at least three sixteen-bit internal registers, designated A, B, C, a thirty-two-bit calculation block Alucalc, and four-bit flag registers, shown in FIG. 5. The flag registers are modified by the ALU 7 according to the type of the computation result. The internal representation of the numbers is as follows:

The operations that the ALU 7 can effect include loading a memory location into a register and vice-versa, having two registers exchange their contents, additions, subtractions, divisions, multiplications, RCR and LCR shifts, logic operations, etc. The ALU 7 is a ten-state sequential machine adapted, in each of its states, to execute a given operation and prepare to retrieve the next. It includes an intelligent portion that allows it to interpret instructions and perform operations of the A*(B+C) type at once by its three internal registers.

Core Fuzzy 6

The core fuzzy 6 is a second dedicated microprocessor for handling and controlling the fuzzy co-processor, also called the fuzzyfier/defuzzyfier. This microprocessor supplies the fuzzyfier/defuzzyfier with properly timed control signals and handles the defuzzyfied outputs and the activation values of the "if" parts of the fuzzy rules. The core fuzzy 6 is a sequential machine working with sixteen bits and is basically a slave to the microprocessor 5, which acts as the master. This core fuzzy 6 is enabled by the microprocessor 5 which issues a signal START. The signal START is brought to a high logic value only upon the instruction START FUZZY RULES being read from the DPRAM 2 or from an interrupt INT0. The machine language code of the fuzzy rules is located in a dedicated area of the DPRAM unit 2 extending from the address ADDRULES.

Initially, the core 6 is in its initial state in which it clears the outputs, and the address bus includes the address of the memory location ADDRULES where the fuzzy routines are stored. In this starting condition, a step of retrieving these routines is carried out. In this state, the core 6 will be waiting for the signal START to be enabled to the next state by the microprocessor 5. Otherwise, the core fuzzy 6 retains its initial state.

Fuzzy Co-processor 11

Figures 6A, 6B:
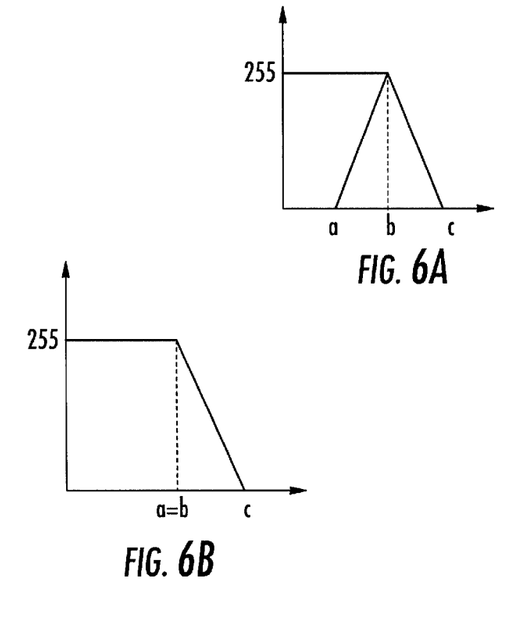
FIGS. 6A, 6B and 6C show respective diagrams of fuzzy logic membership functions used in the architecture of FIG. 1.

This module comes in two possible versions, namely one for membership functions or fuzzy activation functions of the triangular type and the other for fuzzy activation functions of the sigmoid type. The triangular membership functions, shown in the example of FIG. 6A, are those most frequently used in fuzzy logics because they are easy to implement in hardware form.

Figure 7:
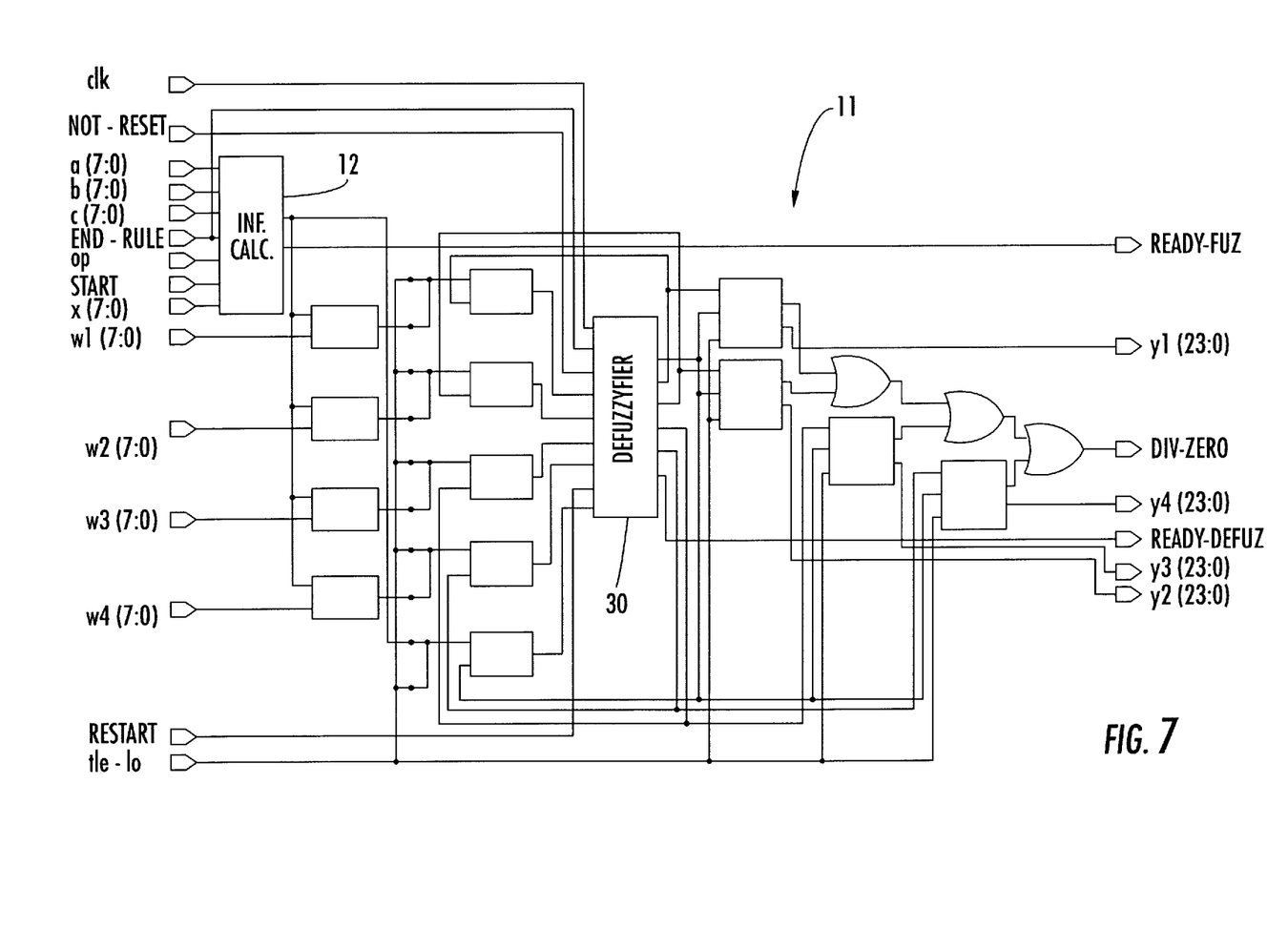
FIG. 7 is a schematic diagram illustrating the construction of a fuzzy microcontroller of the architecture of FIG. 1.

The parameters that must be transferred to the inferential calculation block 12 (also present with the sigmoid membership functions), which calculates the degree of activation, are the vertices of the triangle representing the membership function. Its internal layout is shown in FIG. 7. The inferential calculation block 12 calculates the activation values and their products by the fuzzy logic "then" parts. The block 12 includes blocks AlfaCalc and Defuzzifier, whose functions are specified herein below.

Figure 6C:
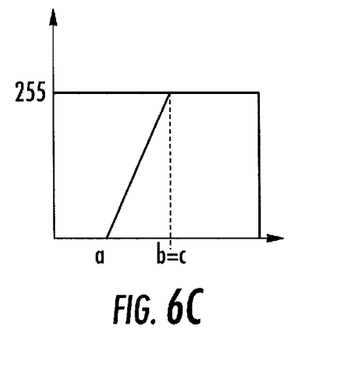

The AlfaCalc calculates the activation value of the input x associated with a given membership function. To outline the technique used for executing this calculation, by way of non-limitative example, each membership function is identified by three, eight-bit encoded parameters 'a', 'b' and 'c' forming its left, center and right coordinates, respectively. Based on this postulate, it becomes possible to represent either membership functions of triangular form or membership functions with saturation. For the latter, either the parameters 'a' and 'b' or the parameters 'b' and 'c' can be taken to coincide, thereby obtaining a left trapezoidal or a right trapezoidal membership function, respectively. This situation is illustrated schematically by FIGS. 6C and 6B.

The Defuzzifier stores the summation of the activation values, as supplied by the block AlfaCalc, and calculates the four summations of their product by the respective fuzzy logic "then" parts. In view of the fuzzyfying and defuzzyfying methods used, only the minimum or maximum "if" part activation value should be stored for each fuzzy rule processed, according to the type of the operation being executed, and subsequently be multiplied by its "then" part. In order to extend the summation to just the minimum or maximum calculated values for each rule, a comparator 15 is used to compare the currently stored value with the next value from the block AlfaCalc. This value is only stored if it is found to be smaller than the current value.

This solution has the advantage of requiring less area and being faster, since none of the internal memories and other modules needed in the sigmoid membership function approach are used here. A disadvantage is a limited fuzzy system performance in terms of non-linearity and FNN learning.

The Fuzzy Core for Sigmoid Membership Functions

Figure 8:
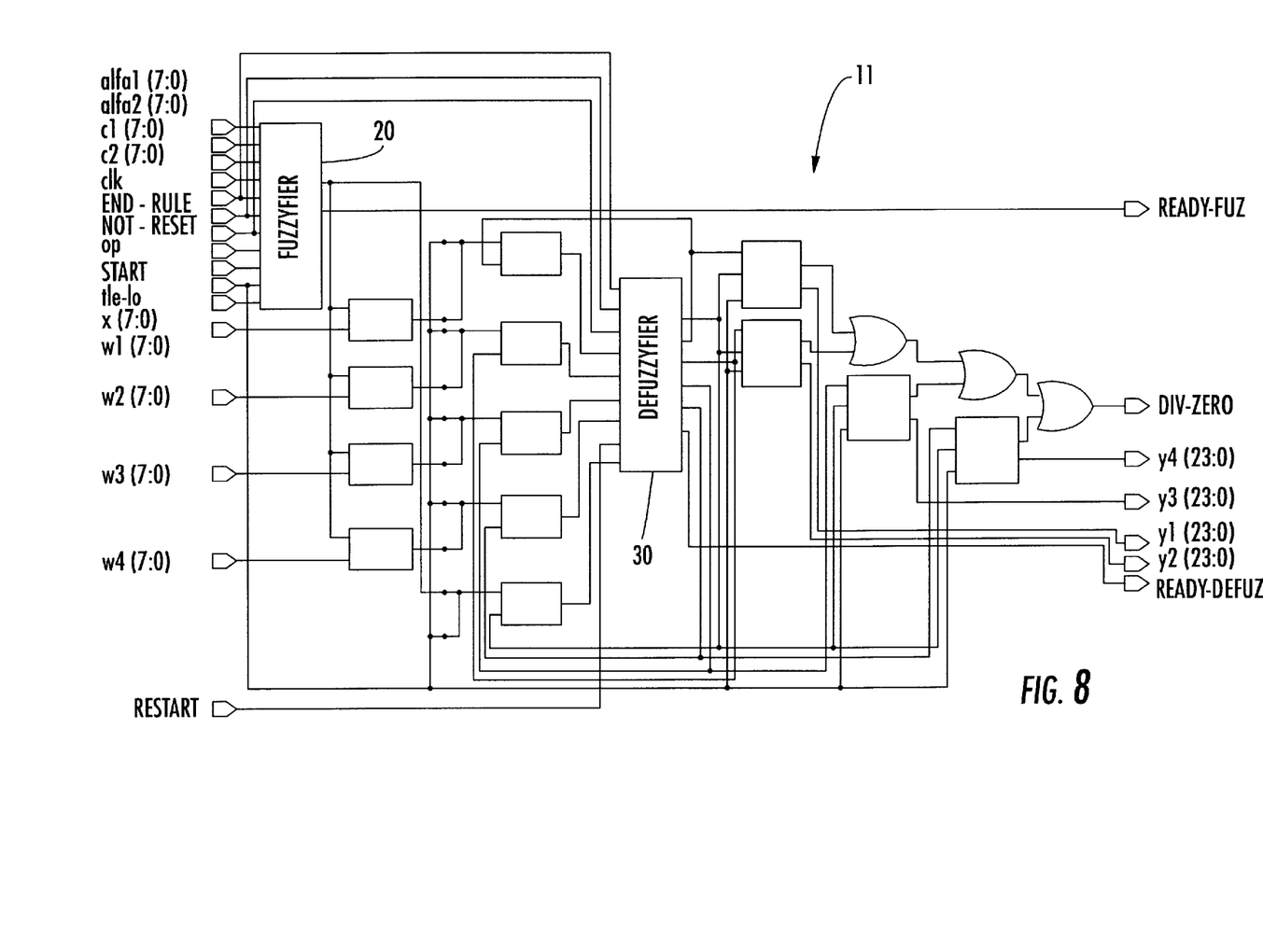
FIG. 8 is a schematic diagram illustrating an alternate embodiment of the construction of a fuzzy microcontroller of the architecture of FIG. 1.
Figure 9:
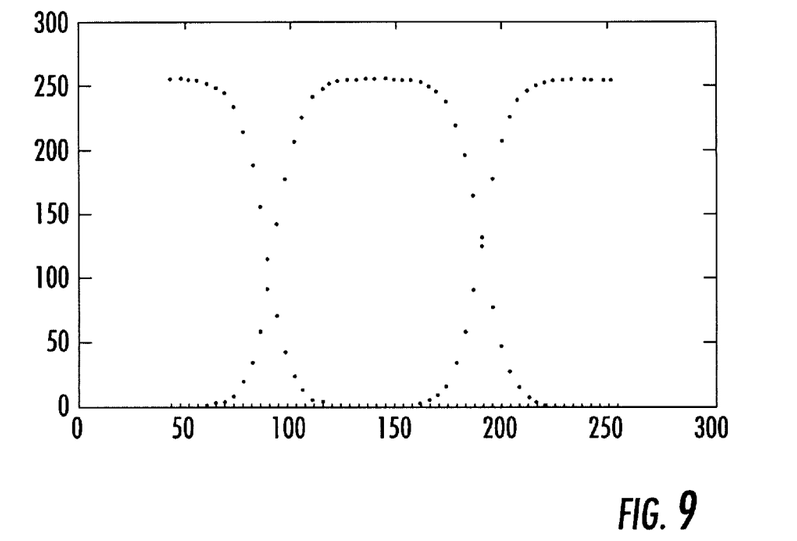
FIGS. 9 and 10 diagrammatically illustrate the membership functions used in the architecture of FIG. 1.
Figure 10:
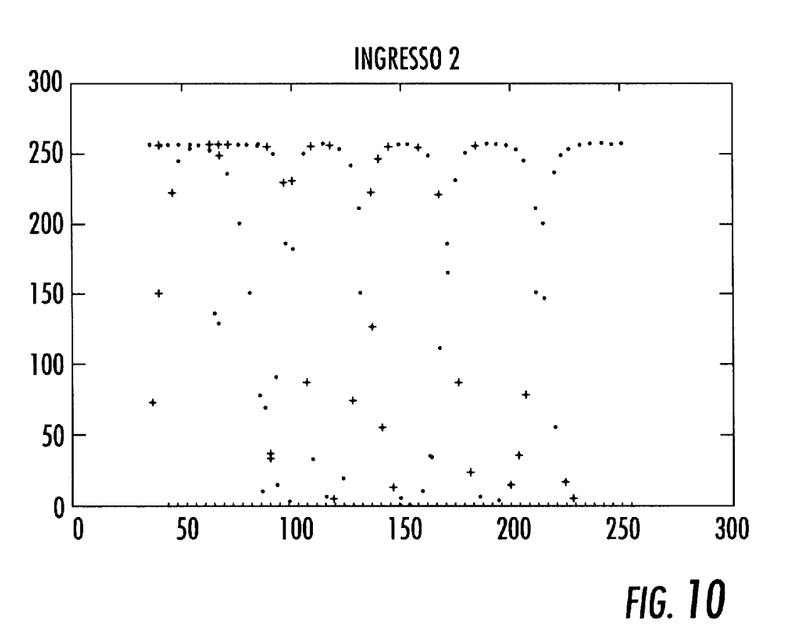
Figure 11:
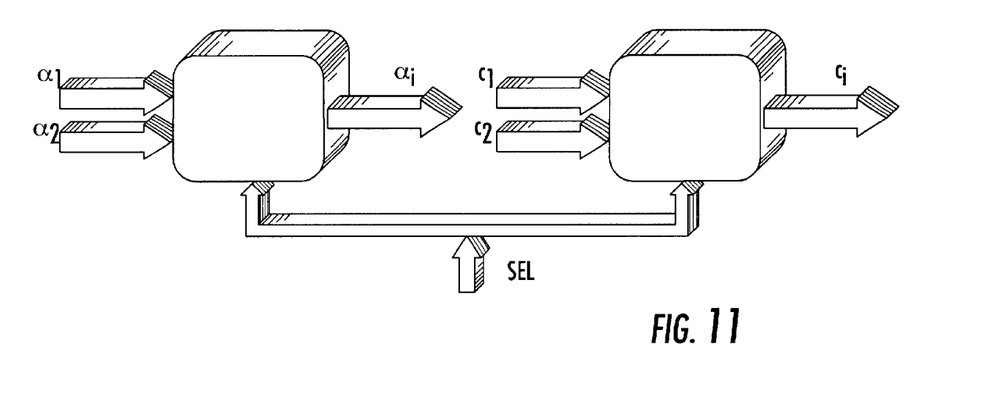
FIG. 11 is a schematic diagram illustrating a component of the architecture of FIG. 1.

The internal layout Fuzzy Core for Sigmoid Membership Functions is shown in FIG. 8. It comprises a fuzzyfier block 20, and a defuzzyfier block 30 inside two macroblocks. The sigmoid activation function is obtained as the difference between two membership functions having different centers and the same or different slopes, according to whether symmetrical or asymmetrical membership functions are sought. For this purpose, a read-only memory is used, such as a ROM 19 wherein the values of a normalized sigmoid of the following type are stored:

$$y = \frac{1 + \tanh k}{2}$$

where the parameter k is given as:

$$k = \alpha(x-c)$$

Once the value of k has been calculated based on the slope a and the center c, it is used through the block AlfaCalc as the address in the ROM 19 from which the corresponding ordinate value of the activation function can be read. By way of example, the inputs a, x, c are 8-bit inputs, thus they may represent values within the 0–255 range.

The architecture chosen being serial, the address is selected by the following logic. The first function parameters are passed first, and the second function parameters are then passed using input multiplexers whose outputs are caused to switch over by a control signal SEL. When SEL=0, a1 and c1 are loaded and the first parameter k1 is calculated based on the current abscissa x. Simultaneously therewith, SEL=1 is assumed, and a2 and c2 are loaded to calculate the parameter k2 using the same abscissa.

At k1 and k2, which represent the addresses in the ROM 19, the ordinate values of the activation function are read and the difference between these values is found. By iterating this process for all the combinations of the parameters a and c, the overall membership function is constructed. Advantageously, the solution proposed in the present invention takes into account the possibility of producing membership functions with a higher or lower slope than one.

Fuzzyfier Block 20

This module is used for the so-called fuzzyfication of the system inputs X, and therefore, to calculate inferential fuzzy rules of the "if" parts, of the following type:

If $x_1$ is $A_{11}$ AND/OR $x_2$ is $A_{12}$ AND/OR ... $x_n$ is $A_{1n}$

The operation Og block 20 will now be described. Each fuzzy set $A_{ij}$ is represented by the parameters $a_1, c_1, a_2, c_2$ indicating the slopes of the sigmoid branches and their centers. These parameters, expressed in an eight-bit binary code, are passed according to the type of the rule and along with a crisp input x to be fuzzyfied.

Before initiating a new set of fuzzy rules, the fuzzy block 20 should be reset so that the signal not_reset becomes zero. In this way, the system is placed in its initial state with the outputs and the internal registers all cleared. When fuzzy rules are to be executed, the signal not_reset must take a value of one. This is mandatory for the architecture 1 to be made ready to execute all the operations included in the following states. In order to move one state forward and execute the calculation of the activation value of the instruction $x_{i\ is\ Ai}$, it is necessary that the start signal be brought to a value of one. As the first instruction $x_i$ is $A_i$ of a generic rule is encountered, the signal Op (FIG. 2) must be brought to one, indicating that the first operation is a logic OR sum.

This condition is necessary for the fuzzyfier block 20 to yield a correct result for the activation value. In fact, all the internal registers are initially cleared. When the first instruction is presented, the OR operation (i.e., the calculation of the maximum value) is executed between the activation value just calculated and the value included in the register ATTIVAZIONEINT, which is zeo, thereby providing the correct value. If, during this first step, the operation had been a logic AND multiplication (i.e., the calculation of the minimum value), the result would be zero (i.e., erroneous).

Figure 13:
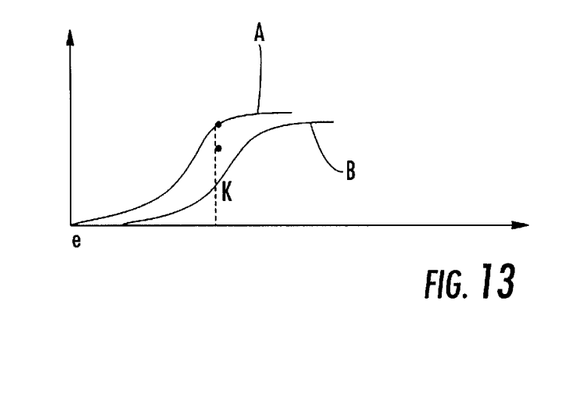
FIG. 13 is a plot of fuzzy logic membership functions used in the architecture of FIG. 1.

As previously mentioned, the membership functions are represented by two sigmoid branches, and only one of them is stored in the ROM 19 and normalized to the value k. To construct the membership function, the difference is found between two sigmoid branches having either different or the same slopes and centers. The result of this difference represents the corresponding activation value to the input x. One example is shown in FIG. 13, where two sigmoid branches A, B have different parameters.

The architecture 1 is serial, and accordingly, the signal SEL=0 causes the parameters $a_1$, $c_1$ and x to be passed, which are used by the block range 1 to calculate $k_1 = a_1(x-c_1)$. This value represents the address in the ROM 19 where the corresponding activation value stored therein can be read. This value is used as an address bus add for the ROM 19. Reading from the latter is always enabled by the ROM 19, which has its input CS and OE at ground value GND. The stored value is read at the address location $k_1$, which is at once loaded into an internal register SIGMA0 of the inference block via a data bus 21 linked to the ROM 19.

During this operation, the output signal ready takes a zero value, indicating that the fuzzy block 20 is processing a fuzzy instruction x is A. Subsequently, the signal SEL is brought to one (SEL=1) by the inference block enabling the input multiplexers 25 of a module RANGE1 to select $a_2, c_2$. The parameter $k_2 = a_2(x-c_2)$ is calculated at x, and the same operation is executed as previously described for $a_1$ and $c_1$, except that the data is now loaded into a register SIGMA1, also inside the inference block.

Thereafter, during the activation step, the difference is calculated between the contents of SIGMA0 and SIGMA1, which difference represents the activation value for the fuzzy instruction $x_1$ is $A_{11}$. Upon completion of this calculation, the signals SEL and READY are again brought down to zero to prepare for the calculation of a new instruction.

The foregoing is iterated as many times as are the number of fuzzy instructions $x_i$ is $A_{ij}$, while also passing each time the type of the composition rule (OR or AND) between them through the signal Op being either 0 or 1, respectively. The activation output will include the partial value of the activation value so far calculated, which will only become definitive upon the signal fine_regola taking the value of one. This indicates the arrival of the instruction "then" that marks the end of a rule to the fuzzyfier block 20.

The Inference Block

Figure 12:
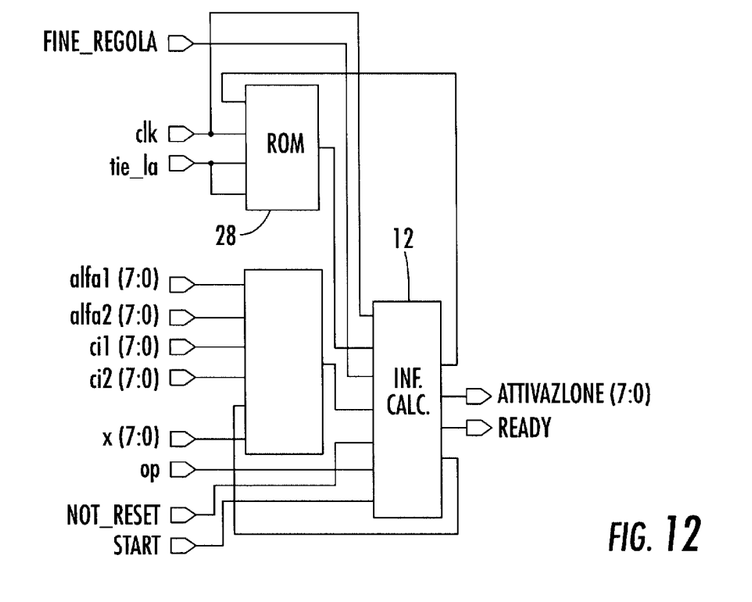
FIG. 12 is a schematic diagram illustrating another component of the architecture of FIG. 1.

This block is represented in FIG. 12 and carries out the fuzzyfication of the inputs.

ROM 3

The read-only memory or ROM 28, also designated tan h, stores the values of one branch of a normalized sigmoid to the parameter k.

Block ADDMEM

This module acquires the parameters relating to the sigmoid membership functions sought and the input fuzzy sets. It also outputs the address of the location in the ROM 28 tan h where the input activation values or degrees of membership corresponding to the fuzzy sets can be read.

Defuzzyfier Block 30 This module calculates the "then" parts of the fuzzy rules and fuzzyfier them by the centroid method, once the fuzzyfier block has output the degree of activation of the inputs. As previously mentioned, the number of rules is 256 at most, with eight inputs and four outputs per rule. However, larger numbers of these rules and the fuzzy instructions $x_i$ is $A_{ij}$ could be provided at the expense of computational speed.

The degree of activation of the inputs is dependent upon the operation that has been selected in the inference block by the signal Op. In fact, for a given input $x_i$, its value of activation to the fuzzy set is calculated using a membership function, designated $\mu_i(x_i)$. This operation is carried out for all the inputs, and on its completion the degree of activation (designated $\mu(R_i)$, with $R_i$ being the i-th fuzzy rule) is calculated as AND, OR, product, scaling product, etc. of all $\mu_i(x_i)$'s. The defuzzyfier module 30 is indeed intended to convert the fuzzyfied outputs of the fuzzy rules into crisp values using the centroid method as given by the following relationship: N°REGOLE $$y_j = \frac{\sum_{i=j}^{N°REGOLE} (\mu(R_i) * W_j)}{\sum_{i=1}^{N°REGOLE} \mu(R_i)}$$

Figure 14:
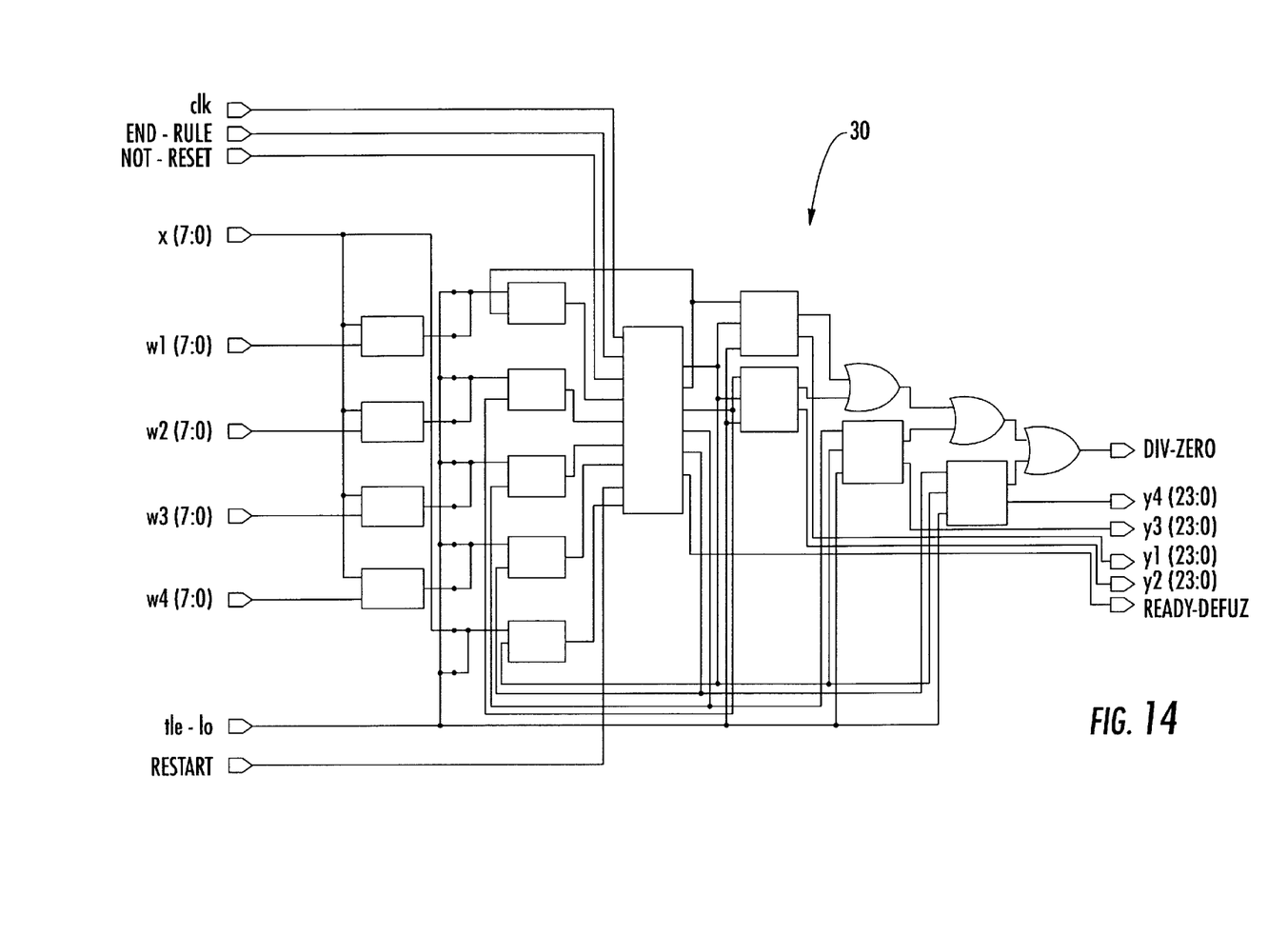
FIG. 14 is a schematic diagram illustrating yet another component of the architecture of FIG. 1.

FIG. 14 shows the internal architecture of the defuzzyfier block 30. At the start of each fuzzy subroutine, the architecture 1 must be reset by enabling the signal not_reset to zero in order to clear all the internal registers and the outputs. Directly after this, the signal not_reset is brought to one. It is only then that the defuzzyfier block 30 will be input with the eight-bit degree of activation of the fuzzy rules from the fuzzyfier block 20. The eight-bit weightings $W_1$, $W_2$, $W_3$, $W_4$ of the FNN network connections, coming from the system input dual-port RAM unit 2, are multiplied with the modules MULT8 to yield a sixteen-bit result.

This operation is carried out in parallel with four multipliers 24 to obtain four defuzzyfied outputs per fuzzy rule. Since the activation signal contains the degree of partial activation of the fuzzy rules, which is to become definitive only when the signal end_rule is one (the equivalent of the instruction "then"), it becomes necessary to provide twenty four bit internal registers, initially reset. This is to include the sum of the signals OUTMOLI being the product of the activation by $W_i$. These outputs represent the numerators NUMI of relationship 6.6, the denominator DE being calculated using a sixteen bit adder and a register of the same dimension. The dimensions, twenty four and sixteen, are from the former instance where 256 iterations must be provided (i.e., for the largest possible number of rules).

Effecting the ratii with four twenty-four-bit divisors between NUMI and DE, the outputs $y_1$, $y_2$, $y_3$, $y_4$ are obtained. These outputs also have twenty four bits (of which only the sixteen least significant bits are meaningful since the eight most significant bits are always zeroes) and represent the four defuzzyfied outputs per fuzzy rule. The defuzzyfier block is a sequential machine.

The fuzzy neural network of this invention is designed to process sequentially any number of inputs. The maximum number of rules in the example is 256, but it may easily be raised above this value by increasing the number of bits of the internal modules (adders, multipliers and dividers) of the defuzzyfier block 30. Furthermore, the architecture of this invention can provide several parallel outputs (in the example, only four such outputs have been illustrated).

The operational code relating to the fuzzy instructions includes encoding the set of fuzzy learning instructions and other operations in binary form. In general, it would be the coding of the following rule format:

if $x_1(t_k)$ is $A_{11}$ AND/OR, . . . ,$x_n(t_k)$ is $A_{1n}$ then $y_1(t_{k+1})$ is $W_{11}$, $y_2(t_{k+1})$ is $W_{12}$, $y_3(t_{k+1})$ is $W_{13}$, and $y_4(t_{k+1})$ is $W_{14}$

- - - learning rule - - -

$w_i(t+1)=w_i(t)\pm(\delta*\mu)*1/1024$

If any abnormality or an interrupt signal occurs (e.g., from the supply system being turned off), the data momentarily in the DPRAM unit 2 is at once loaded into the EEPROM. This preserves the last weighting values, as modified by the learning process, of the FNN connections as well as the activation values and the defuzzyfied outputs.

What is claimed is:

1. A fuzzy network comprising:
   at least one fuzzy microcontroller dedicated to fuzzy rules computing;
   a microprocessor;
   a dual port random access memory;
   a bus interconnecting said fuzzy microcontroller, said microprocessor, and said dual port random access memory; and
   an arbiter circuit connected to said bus, said arbiter circuit controlling access to said dual port random access memory by said microprocessor and said fuzzy microcontroller.

2. The fuzzy network according to claim 1 wherein said memory comprises a volatile memory.

3. The fuzzy network according to claim 1 further comprising a fuzzy co-processor connected between said fuzzy microcontroller and said microprocessor for performing fuzzy logic operations.

4. The fuzzy network according to claim 3 wherein said fuzzy co-processor is a slave to said microprocessor.

5. The fuzzy network according to claim 1 further comprising an arithmetic logic unit connected to said microprocessor.

6. The fuzzy network according to claim 5 wherein said arithmetic logic unit comprises a sequential machine comprising a plurality of internal registers.

7. The fuzzy network according to claim 1 further comprising an input/output (I/O) module connected to said microprocessor for interfacing with external peripherals.

8. The fuzzy network according to claim 1 further comprising a non-volatile memory connected to said at least one fuzzy microcontroller and an interface connected between said dual port random access memory and said non-volatile memory for exchanging data therebetween.

9. A self-training neuro-fuzzy network comprising:
   at least one fuzzy microcontroller dedicated to fuzzy rules computing;
   a non-volatile memory connected to said at least one fuzzy microcontroller and integrated monolithically therewith;
   a microprocessor;
   a dual port random access memory;

a bus interconnecting said fuzzy microcontroller, said microprocessor, and said dual port random access memory; and an arbiter circuit connected to said bus, said arbiter circuit controlling access to said dual port random access memory by said microprocessor and said at least one fuzzy microcontroller.

10. The self-training neuro-fuzzy network according to claim 9 further comprising a fuzzy co-processor connected between said fuzzy microcontroller and said microprocessor for performing fuzzy logic operations.

11. The self-training neuro-fuzzy network according to claim 10 wherein said fuzzy co-processor is a slave to said microprocessor.

12. The self-training neuro-fuzzy network according to claim 9 further comprising an arithmetic logic unit connected to said microprocessor.

13. The self-training neuro-fuzzy network according to claim 12 wherein said arithmetic logic unit comprises a sequential machine comprising a plurality of internal registers.

14. The self-training neuro-fuzzy network according to claim 9 further comprising an input/output (I/O) module connected to said microprocessor for interfacing with external peripherals.

15. The self-training neuro-fuzzy network according to claim 9 further comprising an interface connected between said dual port random access memory and said non-volatile memory for exchanging data therebetween.

16. A method of controlling a device by self-training, the device being monolithically integrated and comprising at least one fuzzy microcontroller for fuzzy rule computing, the method comprising:

writing data to a dual port random access memory;

reading data from the dual port random access memory and executing predetermined sequences of instructions thereon;

interconnecting the fuzzy microcontroller, the dual port random access memory, and a microprocessor with a bus; and controlling access to said dual port random access memory by said microprocessor and said fuzzy microcontroller using an arbiter circuit connected to the bus.

17. The method according to claim 16 further comprising connecting a fuzzy co-processor between the fuzzy microcontroller and the microprocessor for performing fuzzy logic operations.

18. The method according to claim 17 wherein the microprocessor is enabled in an initial state only for reading from the dual port random access memory; and wherein upon recognizing a fuzzy rule code the fuzzy co-processor allows the arbiter circuit to access the dual port random access memory.

19. The method according to claim 16 further comprising connecting an arithmetic logic unit to the microprocessor.

20. The method according to claim 16 further comprising connecting an input/output (I/O) module to the microprocessor for interfacing with external peripherals.

21. The method according to claim 16 further comprising connecting an interface between the dual port random access memory and a non-volatile memory connected to the fuzzy microcontroller for exchanging data therebetween.

22. A method of controlling a device by self-training, the device being monolithically integrated and comprising at least one fuzzy microcontroller for fuzzy rule computing and a non-volatile memory connected thereto, the method comprising:

writing data from the non-volatile memory to a dual port random access memory;

reading data from the dual port random access memory and executing predetermined sequences of instructions thereon;

interconnecting the fuzzy microcontroller, the microprocessor, and the dual port random access memory with a bus;

activating a fuzzy co-processor with an arbiter circuit connected to the bus upon receipt and recognition of a fuzzy logic instruction from the dual port random access memory, the fuzzy co-processor being operated as a slave to the microprocessor.

23. The method according to claim 22 wherein the microprocessor is enabled in an initial state only for reading from the volatile dual port random access memory; and wherein upon recognizing a fuzzy rule code the fuzzy co-processor allows the arbiter circuit to access the dual port random access memory unit.

24. The method according to claim 22 further comprising connecting an arithmetic logic unit to the microprocessor.

25. The method according to claim 22 further comprising connecting an I/O module to the microprocessor for interfacing with external peripherals.

26. The method according to claim 22 further comprising connecting an interface between the dual port random access memory and the non-volatile memory for exchanging data therebetween.

* * * * *

UNITED STATES PATENT AND TRADEMARK OFFICE
CERTIFICATE OF CORRECTION

PATENT NO. : 6,766,310 B1
DATED : July 20, 2004
INVENTOR(S) : Occhipinti et al.

It is certified that error appears in the above-identified patent and that said Letters Patent is hereby corrected as shown below:

Column 2,
Line 44, delete "FIGS. 1" insert -- FIG. 1 --

Column 4,
Line 17, delete "parameter" insert -- parameters --
Line 27, delete "instruction" insert -- instructions --

Column 5,
Line 38, delete "excute" insert -- execute --

Column 8,
Line 13, delete "zeo" insert -- zero --

Signed and Sealed this

Eighth Day of February, 2005

JON W. DUDAS
*Director of the United States Patent and Trademark Office*